Jan. 18, 1938.  W. L. MORRISON  2,105,891
AUTO VENT
Original Filed March 11, 1929   2 Sheets-Sheet 1
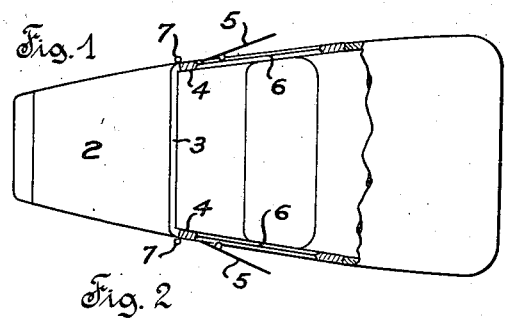
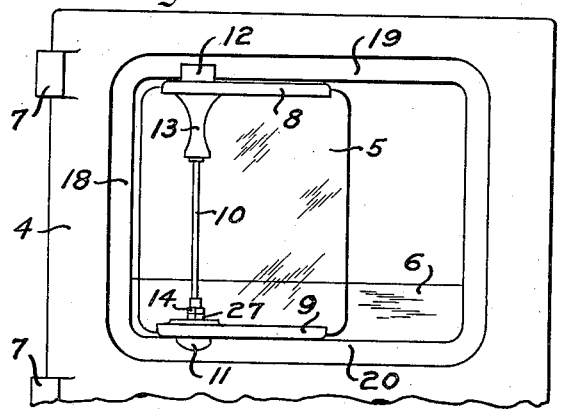
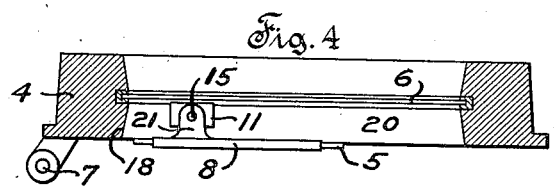
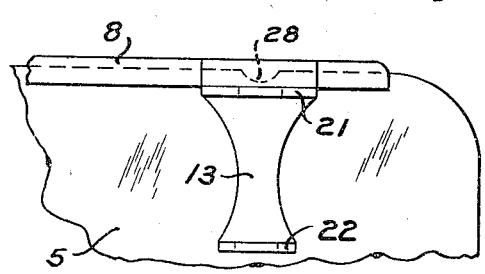
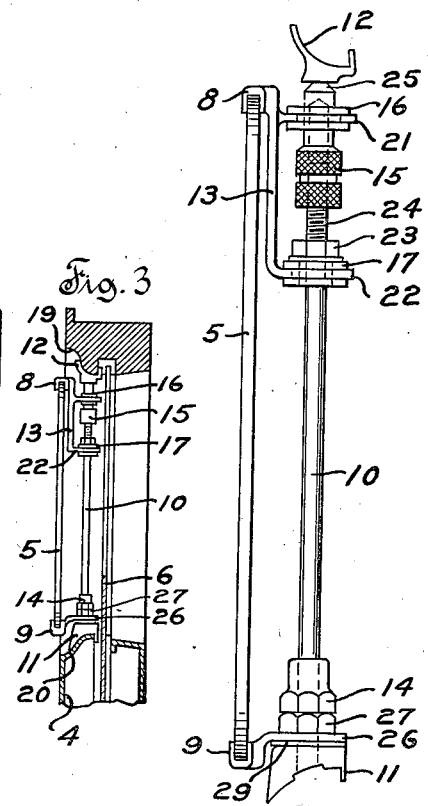
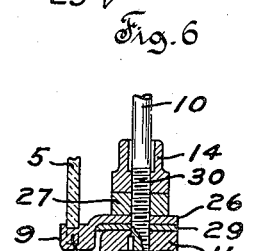
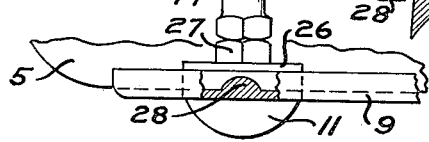
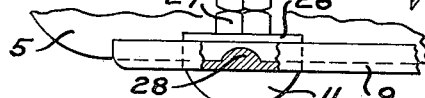
Inventor
W. L. Morrison
by W H Lieber
Attorney Jan. 18, 1938. W. L. MORRISON 2,105,891
AUTO VENT
Original Filed March 11, 1929 2 Sheets-Sheet 2
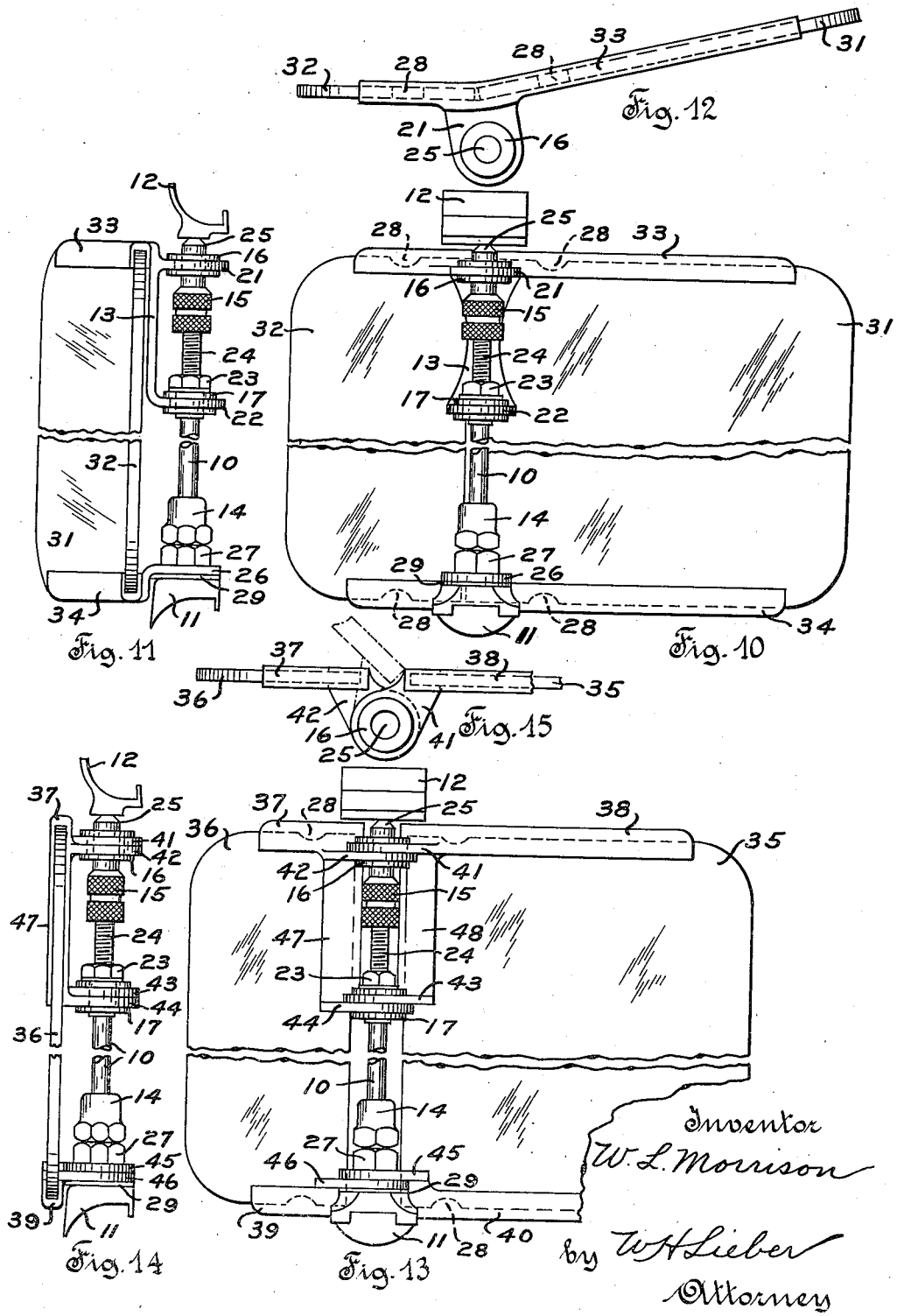

Patented Jan. 18, 1938

2,105,891

UNITED STATES PATENT OFFICE 2,105,891

AUTO-VENT

Willard L. Morrison, Chicago, Ill.

Application March 11, 1929, Serial No. 346,176
Renewed October 2, 1933

12 Claims. (Cl. 296—84)

The present invention relates in general to improvements in apparatus for facilitating ventilation of moving enclosures such as vehicles, and relates more specifically to improvements in the construction of automobile ventilators, which, for the sake of simplicity and convenience, will hereafter be designated as "auto-vents".

A general object of the invention is to provide a new and useful auto-vent which is simple and compact in its construction and efficient in operation, and which may moreover be readily manufactured and conveniently applied to various sizes and shapes of windows. Another general object of the invention is to provide various improvements in auto-vents of the general type forming the subject of copending applications S. N. 274,043, filed April 30, 1928, and S. N. 283,490, filed June 7, 1928.

Commercial exploitation of auto-vents constructed in accordance with the above identified applications, indicates that while these prior devices effectively accomplish their intended purposes, they still embody certain objections. Some difficulty has been encountered with these prior attachments in maintaining the parts of the assembled structure tight and free from objectionable rattling. It has also been found to be necessary in manufacturing prior commercial auto-vents of the type wherein the glass is supported and surrounded by an auxiliary frame, to provide a large number of these auxiliary frames in order to accommodate various types of cars, thereby introducing considerable expense and inconvenience for the manufacturer. The prior ventilating devices wherein a single shield is swingable about a vertical pivot disposed between the front and rear ends of the shield, also prevent convenient cleaning of the main window when the ventilating device is applied to the main window frame. With the prior auto-vents, it was also impossible to position the shields so as to scoop air into the moving vehicle, without positioning the shield in the path or plane of movement of the main window. The cost of construction of the prior ventilating appliances was also undesirably high, and while these previous devices do not materially obstruct the view of the occupants of a car to which they are applied, they do to some extent interfere in this respect.

It is a more specific object of the present invention to provide an auto-vent which may be conveniently applied to or removed from the windows of a vehicle or the like, and wherein objectionable looseness and rattling of parts is effectively avoided. Another specific object of the present invention, is to provide improved supporting structure for the transparent shield of an auto-vent or the like, which is capable of neatly cooperating with window openings of various sizes and shapes, and which may be manufactured at minimum cost. A further specific object of the present invention is to provide improved devices for effecting attachment and removal of auto-vents, to and from the frame or reveals of a window or the like. Still another object of the present invention is to provide a ventilating appliance of the type wherein the deflector is swingable about a vertical axis disposed between the front and rear ends of the shield, which will allow convenient cleaning of the main window with which the device cooperates, without necessitating removal of any part of the appliance. It is a further specific object of the present invention, to provide an auto-vent of the type having a pivot intermediate its front and rear ends, wherein the forward portion of the shield may be utilized as an air scoop without causing the rear portion thereof to interfere with sliding adjustment of the main window with which the ventilator cooperates. These and other objects and advantages will be apparent from the following detailed description.

Some of the novel features of auto-vent construction disclosed but not specifically claimed therein, form the subject-matter of the copending applications referred to hereinabove. A clear conception of several embodiments of the present invention, and of the mode of manufacturing and of applying auto-vents built in accordance therewith, may be had by referring to the drawings accompanying and forming a part of this specification in which like reference characters designate the same or similar parts in the various views.

Fig. 1 is a somewhat diagrammatic top view of a typical two door enclosed automobile having a set of the improved auto-vents associated with the opposite side doors thereof.

Fig. 2 is an enlarged fragmentary side elevation of one of the automobile doors, showing a side view of one of the auto-vents.

Fig. 3 is an enlarged vertical section through the upper part of the door fragment disclosed in Fig. 2, showing an end view of the auto-vent.

Fig. 4 is an enlarged horizontal section through the door, showing the deflector shield of the auto-vent positioned parallel to the glass of the main window.

Fig. 5 is a similar horizontal section through the door, showing the deflector shield adjusted to a position at an angle to the plane of the main window glass.

Fig. 6 is an additionally enlarged end view of the improved auto-vent.

Fig. 7 is a similarly enlarged fragmentary vertical section through the lower portion of the improved auto-vent shown in Fig. 6.

Fig. 8 is a similarly enlarged fragmentary and part sectional outside elevation of the lower por- Fig. 9 is a similarly enlarged inside view of a fragment of the upper portion of the improved auto-vent shown in Fig. 6.

Fig. 10 is an enlarged fragmentary inside view of another form of the improved auto-vent.

Fig. 11 is a similarly enlarged fragmentary end view of the improved auto-vent shown in Fig. 10.

Fig. 12 is a similarly enlarged partial top view of the improved auto-vent shown in Fig. 10.

Fig. 13 is an enlarged fragmentary inside view of still another form of the improved auto-vent.

Fig. 14 is a similarly enlarged fragmentary end view of the improved auto-vent shown in Fig. 13.

Fig. 15 is a similarly enlarged fragmentary partial top view of the improved auto-vent shown in Fig. 13.

Referring specifically to the embodiment of the invention disclosed on Sheet 1 of the drawings, the typical two door automobile illustrated diagrammatically in Fig. 1, comprises a main body 2, a front wind shield 3, and a pair of front side doors 4, all of which cooperate to provide a complete enclosure for occupants of the vehicle. The doors 4 are swingable about hinges 7 disposed forwardly thereof, and are provided with vertically adjustable plate glass windows 6 of ordinary construction. The windows 6 may be adjusted in a well known manner, to open, closed or any intermediate position, and are provided with front reveals 18 and with top and bottom reveals 19, 20 respectively. The window reveals 18, 19, 20 are provided with sloping external surfaces extending away from the plane of adjustment of the main window 6, and while the shape of these reveals in different types of cars is somewhat different, the outer reveal surfaces always diverge outwardly away from the main window opening and are ordinarily of considerable width.

The improved auto-vent shown in detail on Sheet 1 of the drawings, comprises generally a set of upper and lower supporting pads 12, 11; pad retaining structure consisting of a pivot rod 10 having a spreader 15 and nuts 23, 14, 27 associated therewith; top and bottom supports 8, 9 pivotally mounted upon the pivot rod 10; and a transparent deflector shield 5 rigidly attached to the supports 8, 9.

Each of the supporting pads 12, 11 is formed to snugly fit the inclined surface of a reveal 19, 20 with which it is supposed to coact, and is provided with a hook which is engageable with the inner edge of the reveal as shown in Fig. 3, in order to retain the pad in desired position. The surfaces of the pads 12, 11 which coact with the reveal surfaces, are preferably faced with felt so as to avoid damaging the surfaces of the reveals. The lower end of the pivot rod 10 is rigidly attached to the lower pad 11 by means of a key as shown in Fig. 7, and is provided with screw threads 30. The bottom support 9 which consists of a channel strip engaging the lower edge of the shield 5, has an integral inwardly extending flange 26 which pivotally engages the rod 10 and rests upon a washer 29 which in turn rests upon the lower pad 11. The support 9 may be clamped in adjusted position relative to the rod 10, by means of a clamping nut 27 coacting with the screw threads 30 of the rod 10 and with the top of the flange 26. The lock nut 14 which likewise coacts with the screw threads 30 of the rod 10, is engageable with the upper surface of the clamping nut 27 to lock the same in position. The top support 8 consists of a channel strip engaging the upper edge of the shield 5, and is formed integral with a depending bracket 13 having upper and lower integral inwardly extending flanges 21, 22 respectively, the upper of which pivotally engages the spreader 15 and the lower of which likewise engages the upper end of the rod 10.

In order to avoid looseness and possible rattling at the flanges 21, 22, resilient bushings 16, 17 preferably formed of soft rubber, are disposed between these flanges and their pivotal supports, as shown in Fig. 6. The upper end of the rod 10 is provided with screw threads 24, and a clamping nut 23 which coacts with these threads, may be adjusted to press against the lower bushing 17 in order to retain the upper support 8 in assembled position upon the shield 5. The spreader 15 is also adjustable along the rod 10 and within the bushing 16, by virtue of the screw threads 24, and has its upper extremity 25 pointed to provide pivotal coaction with a recess formed in the upper pad 12. The upper and lower supports 8, 9 are provided with projections 28 disposed within the longitudinal recesses of the supports and cooperable with notches in the top and bottom edges of the deflector shield 5, in order to prevent horizontal displacement of the shield. In addition to these holding projections 28, the shields are cemented into the channel supports to provide a rigid union between these parts.

The improved modified auto-vent shown in detail in Figs. 10, 11 and 12 of Sheet 2 of the drawings, is generally similar to that just described, differing only in the construction of the deflector shield, and of the supports thereof. In the modified construction, the deflector comprises front and rear rigidly united shields 32, 31 respectively, the former of which is only about one half as long as the latter in a horizontal direction. The shields 32, 31 are disposed at a slight angle relative to each other, and practically abut each other adjacent to the pivot rod 10. The upper and lower shield supports 33, 34 are shaped to maintain the shields 32, 31 in proper relative position, and are pivotally associated with the rod 10 and with the spreader 15 in a manner similar to that previously described in connection with the embodiment of Fig. 6.

The improved modified auto-vent shown in detail in Figs. 13, 14 and 15 of Sheet 2 of the drawings, also embodies features in common with the auto-vents previously described herein. In this modification, the deflector comprises front and rear relatively adjustable shields 36, 35 respectively, the former of which is likewise considerably shorter than the latter in a horizontal direction. The front shield 36 is pivotally mounted with respect to the rod 10 and the spreader 15, by means of top and bottom supports 37, 39 respectively, the former of which has an integral bracket 47 directly engageable with the rear edge of the shield 36. Flanges 42, 44 formed integral with the bracket 47, pivotally engage the spreader 15 and the rod 10 respectively, and a flange 46 formed integral with the bottom support 39, likewise pivotally engages the lower portion of the rod 10. The rear shield 35 is also pivotally mounted with respect to the rod 10 and the spreader 15, by means of top and bottom supports 38, 40 respectively, the former of which has an integral bracket 48 engageable with the front edge of the shield 35. Flanges 41, 43 formed integral with the bracket 48, pivotally engage the spreader 15 and the rod 10 respectively, and a flange 45 formed integral with the bottom support 40, likewise pivotally engages the lower portion of the rod 10. It will be apparent that the shields 36, 35 are independently angularly adjustable about the pivot rod 10, and that the same clamping nuts 23, 27 and lock nut 14, serve to lock both of the shields in adjusted position.

The several improved types of auto-vents may be readily applied to the reveals 18, 19, 20 of a window after assembly of the structures in the manner described, by merely positioning the supporting pads 11, 12 upon the lower and upper reveals 20, 19 respectively as shown in Fig. 2, and by subsequently manipulating the spreader 15 to cause the hooks of the pads 11, 12 to engage the inner reveal surfaces and to frictionally retain the device in place. The deflector shields may then be swung about the pivot rod 10 to any desired position, and can be subsequently locked in adjusted position by proper adjustment of the nuts 23, 14, 27. The spreader 15 may be adjusted by means of the operator's fingers, and the clamping and locking nuts may be manipulated with the aid of ordinary pliers or a wrench. With the deflector shields properly positioned, the normal vertical sliding of the main window 6 is not interfered with, but the window 6 should be at least partially open in order to provide utility for the auto-vent. Any of the several types of auto-vents described, may be readily constructed to cooperate with various styles and shapes of windows, but the devices have special utility when applied to the doors of rapidly movable vehicles as shown.

In order to provide a practical auto-vent, it is necessary to eliminate objectionable rattling of the parts, and this condition is effectively taken care of in the improved construction, by means of the resilient bushings 16, 17. These rubber bushings do not interfere with the pivotal adjustment of the shields, but maintain tight fits between the parts and function as shock absorbers which protect the glass shields from breakage. These bushings 16, 17 are moreover readily replaceable and are relatively inexpensive.

The elongated channel supports cooperating with the upper and lower rectilineal edges of the transparent shields, provide effective mountings and may be applied to shields of various lengths and heights, without alteration. The projections 28 cooperating with the notches in the upper and lower edges of the glass shields, effectively prevent displacement of the glass, and the supports by virtue of their cooperation with the extreme upper and lower portions only of the shields, produce minimum obstruction to the view of occupants of a car to which the device is applied. The shield supports may be formed as die castings, and the depending brackets and lateral spaced flanges formed integral with the upper supports, maintain the rod 10 and the spreader 15 coaxially alined and prevent possible breakage of the shields due to the lateral tilting of the upper support when assembling the structure and during adjustment of the clamping nut 23. It will be noted that in the type of auto-vents disclosed in Figs. 6 and 11, the depending brackets 13 do not directly engage the sides of the deflector shields at any time.

With the modified auto-vents illustrated on Sheet 2 of the drawings, the deflector shields may be set so that the front portions thereof serve as scoops for admitting air to the interior of a forwardly advancing vehicle to which the devices are applied. These modifications possess the added advantage that they enable convenient cleaning of the main window 6 without removing the auto-vent, since in these devices, both the forward and rear shield portions may be swung at a considerable angle away from the main window 6 when closed. This advantage is more pronounced in the modification of Figs. 13 to 15 inclusive wherein the shields 36, 35 may be swung independently of each other about the pivot rod 10, but the device of this modification introduces objectionable complications in the construction of the shield supports, which are not encountered in the device of Figs. 10 to 12 inclusive.

The various parts of the improved auto-vents may be readily constructed to present a neat appearance, and all of the improved devices may be conveniently applied, manipulated or removed, whenever desired.

It should be understood that it is not desired to limit the present invention to the exact details of construction herein shown and described, for various modifications within the scope of the claims may occur to persons skilled in the art.

It will be noted that in this construction there is an air deflecting device which is pivotally mounted and which has its pivotal mounting within the reveals of the automobile window. It will further be noted that this air deflecting device has its pivots located between its front and rear ends as is clearly shown in the drawings. By means of this construction it will be seen that the deflector 5 may be moved about its pivotal connection until the front end projects into the automobile and that when the deflector is moved so that it stands substantially at right angles to the outer face of the automobile or at an acute angle to the part in front of the pivots it acts as a scoop to scoop air into the automobile.

In the construction shown on Sheet 2 various other scooping arrangements are shown. In Fig. 12, for example, the front end will act as a scoop when the rear end is parallel with the face of the window opening. In Figs. 13, 14 and 15 this same result can be secured with a greater choice of adjustment in variation for the rear end 35 may remain parallel with the face of the window opening and the front end 36 may be moved out to any desired scooping position. It will further be seen, particularly in the construction shown in Figs. 13, 14 and 15, that the rear portion 35 may be moved outwardly to act as a deflector and the front portion 36 remain parallel with the face of the window opening, thus getting the deflector action without permitting air to come in at the front of the window.

The construction shown in Figures 13, 14 and 15 may be used in a number of different ways. In the construction shown in Figures 13, 14, and 15 the friction washer 29 is utilized in the same way as in the other devices, except that in this construction when the nuts are tightened the parts may be easily held in frictional engagement so that the front and rear sections 35 and 36 may be moved to different angular positions with relation to each other and will be maintained in such angular positions. In devices of this kind, when it is raining and the deflector is moved to an angular position, the front end ordinarily projects into the automobile and water runs from this front end down into the automobile and on the knees of the driver, which is an objectionable feature. With the construction of Figs. 13, 14 and 15 this objectionable feature can be easily prevented, for the section 36 may be moved to its closed position and the section 35 moved out to an angular position so that air may be withdrawn from the automobile without letting the rain in. Furthermore, when it is not raining, by closing the front section 36 and moving the rear section 35 out to an angular position, air can be withdrawn from the car without air entering it at the front of the device. This is particularly desirable in cold weather. Furthermore, the front section 36 may be moved outwardly to any desired angle to scoop air in at the front, the back section being closed. Again in cold weather, particularly when the car is first entered, the moisture of the breath deposits on the wind shield so as to obstruct the vision. By means of this device by simply manipulating the front section a cross draft can be secured along the wind shield which will remove the obstructing deposit thereon due to the breath and this can be done without opening the rear portion 35. The result is thus accomplished without injecting too much cold air in the car. In other words, it will be seen that by this construction the rear and front sections may be operated as a unit or may be operated independently to secure a number of different results.

It is claimed and desired to secure by Letters Patent:—

1. In combination, a pair of spaced pads, a pivot rod coacting directly with one of said pads, a spreader interposed between said rod and the other of said pads, a deflector shield swingable about said rod, means pivotally connecting one end of said shield with said rod, and means for pivotally connecting the opposite end of said shield with both said rod and said spreader.

2. In combination, a vertically disposed, transparent deflector shield, supports associated with the opposite edges only of said shield, a pivot rod upon which said supports are swingably mounted, and pads for supporting said rod, said rod constituting the sole connection between said supports and one of said supports coacting with said rod intermediate the ends of said shield and remote from the adjacent pad.

3. In combination, a deflector shield having upper and lower edges, channel supports associated only with said edges, a pivot rod upon which said supports are swingably mounted, a spreader upon which one of said supports is also swingably mounted, and pads for supporting said rod, one of said pads coacting with said rod and the other with said spreader.

4. In combination, a deflector shield having opposite edges, a support secured to one of said edges and having a flange, a support secured to the other of said edges and having a pair of flanges, a rod pivotally associated with one of said flanges of each of said supports, a spreader adjustable along said rod and pivotally associated with one of said pair of flanges, and pads coacting with said rod and with said spreader.

5. In combination, a deflector shield, supports secured to remote portions of said shield, one of said supports having a pair of spaced flanges formed integral therewith, a rod pivotally engaging one of said flanges, a spreader adjustable along said rod and pivotally engaging the other of said flanges, and a pad providing a pivotal support for said spreader.

6. In combination, a deflector shield, a support for one portion of said shield having a pair of flanges formed integral therewith, a support for another portion of said shield having a single integral flange, a rod pivotally associated with a flange of each of said supports, a spreader coaxial with said rod pivotally associated with the other of said flanges, and a pair of pads coacting with said spreader and with said rod respectively.

7. In combination, a pivot rod, vertically spaced supports pivotally associated with said rod, a rubber bushing interposed between one of said supports and said rod, one of said supports having a projection extending toward the other, a glass shield having a notch engaging said projection, and means coacting with said bushing to hold said projection within said notch.

8. An air deflecting device for automobiles having a sliding window, comprising a deflector shield made up of two sections with their edges adjacent, the front section being shorter longitudinally of the car than the rear section, the two sections being pivotally connected in the window opening at their adjacent ends, said pivotal connection being near the forward end of the window opening, whereby the two sections may be pivotally moved as a unit or the two sections may be independently moved about the pivotal connection.

9. An air deflecting device for automobiles having a window opening comprising a deflector shield made up of two sections with their edges adjacent, the two sections at their adjacent edges pivotally connected in the same window opening so that they may be independently moved to various angular positions, the two sections controlling the forward part of the window opening, and means for partially closing the portion of the window opening at the rear of the deflector without interfering with the movement of the rear section of the deflector to its various angular positions.

10. An air deflecting device for automobiles comprising a transparent deflector section pivotally mounted in the window opening on an up and down axis, and upper and lower pads fitting over the reveals of the window opening for holding said section in place, whereby the deflector section may be installed without defacing the window reveals.

11. An air deflecting device for automobiles having a window opening bounded by reveals comprising two sections, pivotal frictional means for supporting the two sections so that they are swingable independently, said pivotal frictional means being located back of, but adjacent to the forward edge of and within the reveals of the window opening, one of said sections being mounted forward of and the other rearward of said pivotal frictional means.

12. An air deflecting device for automobiles comprising a transparent deflector shield, pivotal connections for said deflector shield at the top and bottom thereof, intermediate the front and rear ends of the deflector section and located in the window opening within the boundary of the reveals, upper and lower pads fitting over the upper and lower portions of the reveals of the window and interposed between the reveals of the window and said pivotal connections, the parts arranged so that the deflector shield may be moved about an up and down axis, so that the front end of the deflector shield may be moved into the window opening, to scoop air into the automobile.

WILLARD L. MORRISON.